April 8, 1952     J. P. BUTTERFIELD     2,592,391
ADJUSTABLE SUSPENSION FOR VEHICLES
Filed Dec. 13, 1947     2 SHEETS—SHEET 1

INVENTOR.
John P. Butterfield.
BY
Harness and Harris
ATTORNEYS.

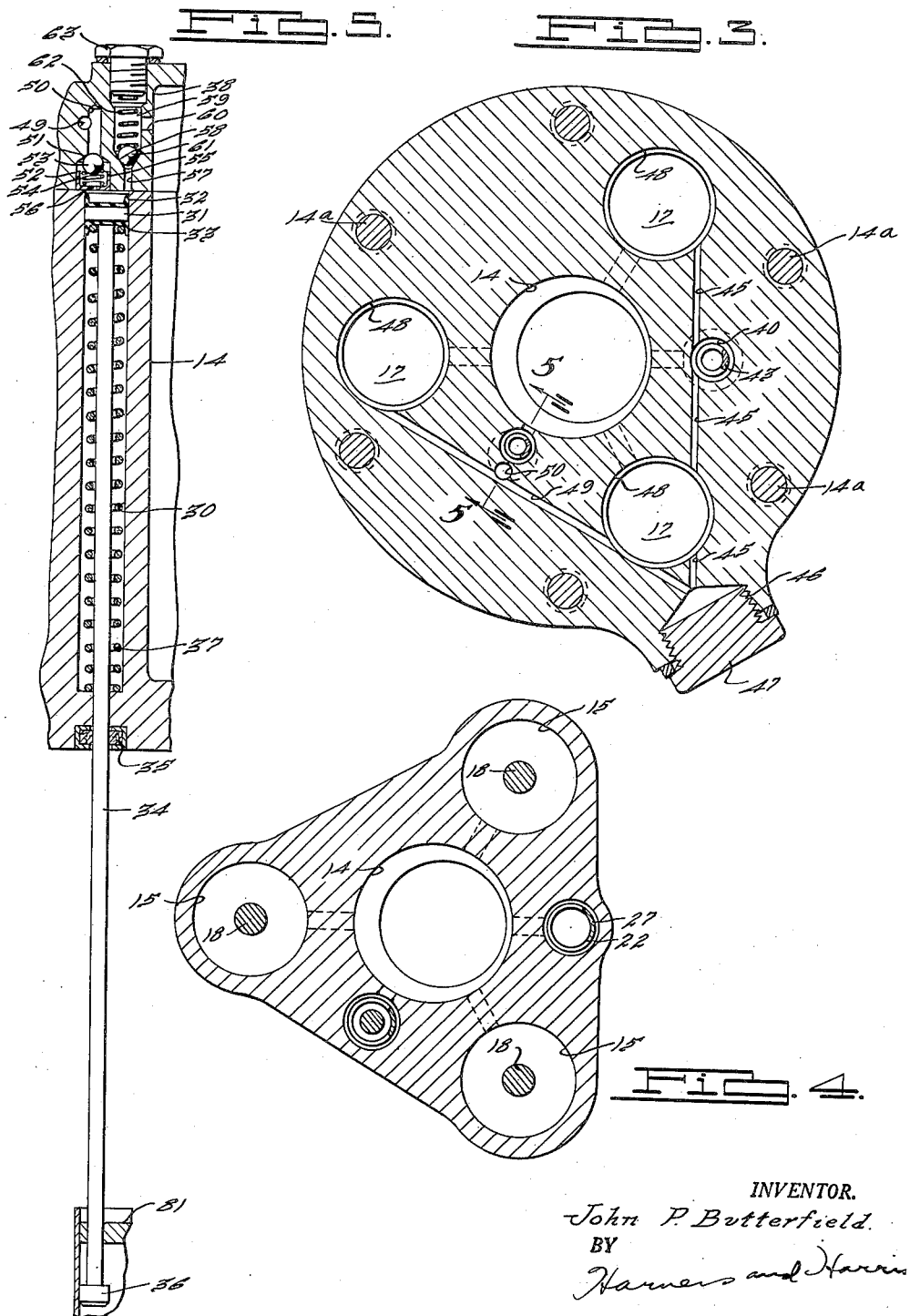

Patented Apr. 8, 1952

2,592,391

UNITED STATES PATENT OFFICE 2,592,391

ADJUSTABLE SUSPENSION FOR VEHICLES

John P. Butterfield, Grosse Pointe Woods, Mich., assignor to Chrysler Corporation, Highland Park, Mich., a corporation of Delaware Application December 13, 1947, Serial No. 791,616

10 Claims. (Cl. 267—65)

This application relates to an adjustable suspension for a vehicle. More specifically it relates to a suspension, in which adjustment is made through hydraulic means.

Problems arise in the provision of a satisfactory suspension for a vehicle in which the ratio of vehicle-body load plus carried load such as passengers to vehicle-body load is relatively high. If the suspension springs are soft enough for a good ride when the total load is relatively low, the deflection of the springs at full load may be higher than desirable. If the suspension springs are stiff enough to keep the deflection to satisfactory limits, the ride at light loads may be uncomfortable.

An object of the present invention is to provide an improved vehicle suspension in which adjustment is made at heavy loading to compensate for a relatively great deflection of springs. The adjustment may be carried out by hydraulic means.

Another object is the provision of an hydraulic means for use in an adjustable suspension for a vehicle. This hydraulic means may be closely associated with an hydraulic shock absorber for the vehicle suspension.

Other objects will appear from the disclosure.

In the drawings:

Fig. 3 is a section taken on the line 3—3 of Fig. 1;

Fig. 4 is a section taken on the line 4—4 of Fig. 1; and

Fig. 5 is a section taken on the line 5—5 of Fig. 3.

Figures 1, 2:
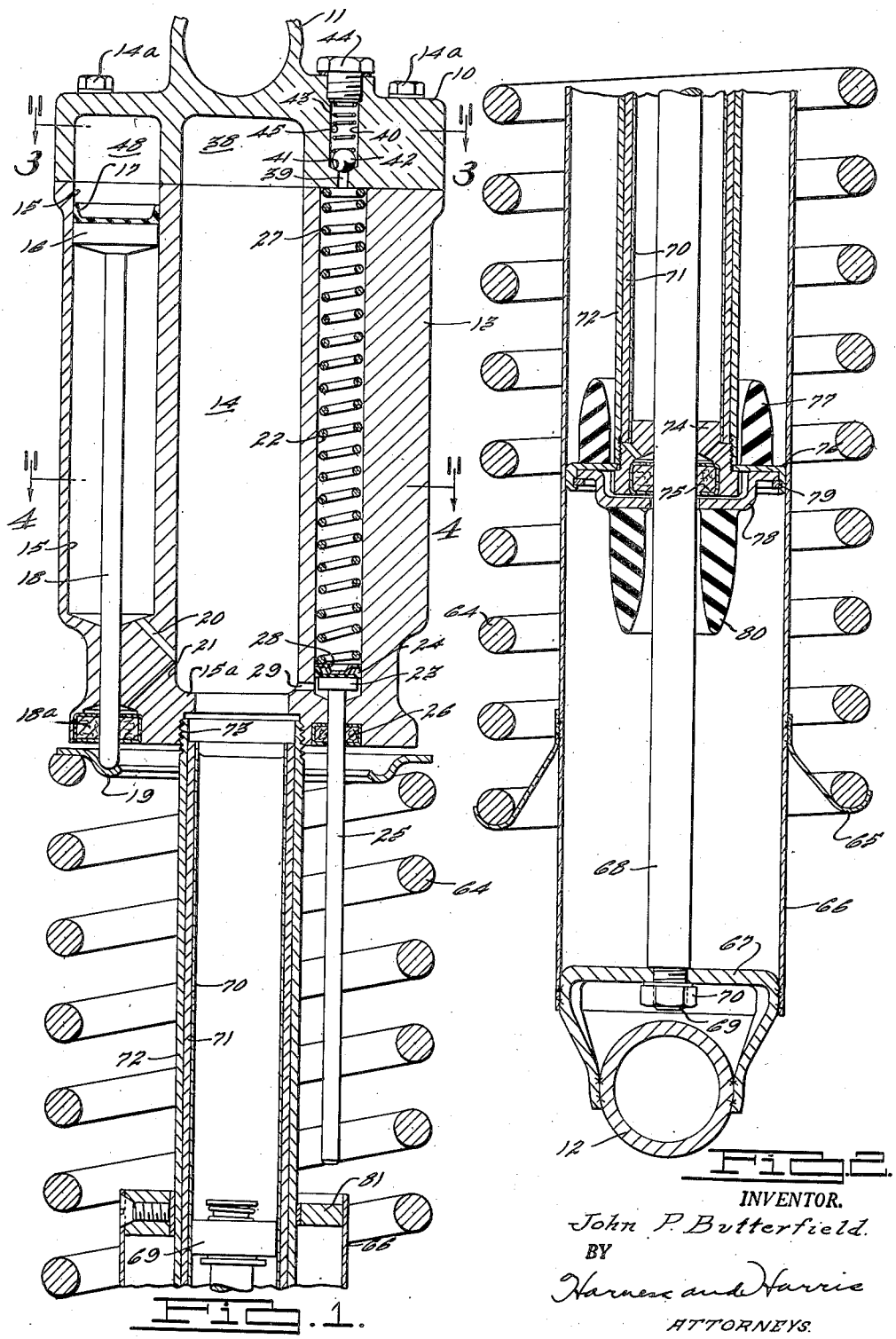
Fig. 1 is a sectional view through the upper half of the improved suspension of the present invention.
Fig. 2 is a section through the lower half of the suspension.

Reference character 10 designates a head, which has a ring portion 11 adapted to be secured to a member, not shown, associated with the vehicle body. The reference character 12 designates a ring adapted to be associated with wheels for the vehicle. Between the ring portion 11 and the ring 12, or between the vehicle body and the vehicle wheels, is located the novel suspension of the present invention, which is about to be described.

The head 10 is secured to a body 13 by means of a plurality of screws 14ª. The body 13 has a large central cylindrical opening 14 reduced at its lower end by a shoulder 15ª, as seen in Fig. 1. This cylindrical opening 14 may be termed a reservoir or chamber, because it is adapted to store fluid used for lifting purposes as will be described presently.

Surrounding the storage chamber 14 in spaced relation are three cylindrical openings 15, as seen in Figs. 1 and 4. Each of the openings 15 slidably houses a lifting piston 16 having at its upper side a seal 17 and at its lower side a rod 18 projecting through the base of the housing 13 and a seal 18ª contained in the base into engagement with a ring 19. A passage 20 leads from the base of the chamber formed by the opening 15 to the base of the storage chamber 14. A passage 21 leads from the seal 18ª to the base of the storage chamber 14. A cylindrical bore 22 formed in the housing 13 contains a piston valve having a head 23 that is smaller than the bore 22 so as to fit quite loosely therein, and a rubber seal 24 on the piston head fitting closely within the bore 22. A rod 25 projects from the head 23 through the housing 13 below the base of the bore 22 and through a seal 26 carried by the housing. A coil spring 27 acting between the head 10 and a dished member 28 resting on the seal 24 urges the seal 24 and the piston 23 to the low position shown in Fig. 1. A passage 29 connects the bases of the bore 22 and the storage chamber 14. As seen in Fig. 5, a bore 30 formed in the body 13 houses a piston 31 which fits the bore snugly. The piston 31 has seals 32 and 33 at its upper and lower sides and a rod 34 projects from the piston through the body 13 at the base of the bore 30 and through a seal 35. The lower end of the rod 34 is formed as an enlarged head 36. A coil spring 37 positioned in the bore 30 acts between the seal 33 and the base of the bore 30 to urge the piston 31 and its rod 34 to the high position shown in Fig. 5.

The head 10 has a central recess 38 extending in alignment with the central bore 14 formed in the body 13 to close the upper end of the storage chamber. A narrow passage 39 is aligned with and extends from the bore 22 and above it there is a larger passage 40 joined to the passage 39 by a seat 41, which is shown in Fig. 1 to be closed by a ball valve 42 under the influence of a coil spring 43. The upper end of the coil spring 43 is engaged by a threaded plug 44 mounted in the head 10 adjustable so as to control the pressure exerted by the coil spring 43 upon the ball valve 42. As seen in Fig. 3, the passage 40 is intersected by a passage 45, which may be formed by drilling, in an operation through which access for the drilling tool is had through a flanged threaded opening 46 formed on the head 10 and closed by a plug 47. The passage 45 intersects not only the passage 40 but also bores 48 formed in the head 10 as extensions of the bores 15 in the body 13.

A bore 49, which may also be formed by a suitable tool applied to the head 10 through the opening 46 connects the recess 48 adjacent the opening 46 and another recess 48. The bore 49 also intersects a relatively small vertical passage 50 joined by a shoulder 51 with a relatively large passage 52. The shoulder 51 serves as a seat for a ball valve 53 urged to closing position by a coil spring 54 acting between the ball valve 53 and the inside of the base of a cup 55 having an opening 56 formed in the base.

The passage 52 in the head 10 communicates with the upper end of the bore 30 in the body 13, although the two are not axially aligned. A small passage 57, also in the head 10, communicates with the upper end of the bore 30. The small passage 57 is joined by a shoulder 58 with a larger passage 59. An opening 60 joins the passage 59 with the recess 38. Shoulder 58 serves as a seat for a ball valve 61 urged to closing position by a coil spring 62, which acts between the ball valve and a plug 63 threaded in the head 10 so as to be adjustable with respect thereto and thereby to adjust the pressure of the spring 62 upon the ball valve 61.

As previously stated, the lower ends of the piston rods 18 engage ring 19, which may be seen in Fig. 1 to rest upon the upper end of a coil spring 64. The lower end of this spring rests in a flanged member 65 bonded to a tube 66 forming part of a shock absorber. The tube 66 is bonded to a base 67, in turn bonded to the ring 12. A rod 68 is bolted to the base 67 by a threaded reduced portion 69 on the lower end of the rod extending through the base 67 and a nut 70 engaging the threaded end. The upper end of the rod 68 carries a shock-absorber piston, which is not shown in detail, but which, it is to be understood, may have valve-controlled passages by which flow of fluid in two directions through the piston is regulated. The piston 69 is slidably mounted in a lining 70 on the inside of a tube 71 mounted in another tube 72. The two tubes are fastened to one another as by a shrink fit, and the outer tube is attached to the body 13 through engagement of a threaded portion 73 on the upper end of the tube with the body 13. The lower end of the tubes 71 and 72 are fastened to a fitting 74 slidably receiving the piston rod 68. Fitting 74 contains a seal 75 through which the piston rod 68 passes. A flanged member 76 clamped between the outer tube 72 and the fitting 74 slidably engages the tube 66 and carries a rubber bumper member 77. A cupped member 78 latched to the flanged member 76 by a ring 79 carries a rubber bumper member 80 engageable with the base 67. The upper end of the tube 66 carries a ring 81 slidably receiving the tube 72. The valve rod 34 passes through the ring 81 and the enlarged head 36 on the valve rod and is engageable with the ring 81 upon upward movement of the valve rod 34 from the position of Fig. 5. The ring 81 is in a position to be engaged by the valve rod 25 upon downward movement of the rod from the position of Fig. 1.

The operation of the shock absorber comprising essentially the piston 69 and the tube set 71—72 in which the piston moves is conventional. Fluid above and below the piston 69 passes through the piston when sufficient force is applied tending to move the body and the wheels toward or away from one another. The force must be sufficient to open the valve passages through the piston 69 against the resistance of appropriate springs. For appropriate shock-absorber action, the resistance to flow of fluid through the piston may be different in one direction from what it is in the opposite direction. The shock absorber is positioned within the suspension spring 64 and acts in parallel with it.

It is intended that there be sufficient fluid at least partially to fill the storage chamber 14, which is positioned as an axial extension of the shock-absorber tubes 71 and 72. As the load upon the vehicle body is increased, the suspension spring 64 is compressed causing the upper end of the spring, the ring 19, the body 13, and the head 10 to move downward toward the lower end of the spring 64 and the wheel-connected member 12. When sufficient compression of the spring 64 has taken place, the end of the rod 25 engages the ring 81. Now when relative reciprocation of the members supported on the upper end of the suspension spring 64 takes place with respect to the lower end of the spring and the wheels, because of bounce or jounce, for example, the piston 23 and associated seal 24 reciprocate in the bore 22 because of the action of the coil spring 27 and repeated engagement of the valve rod 25 with the ring 81. During this reciprocation, upward movement of the piston 23 and associated seal 24 moves fluid above the piston and seal upwards past the ball valve 42 which is lifted from its seat 41, through the bores 45 and 49 into the recesses 46 and the cylindrical openings 15. This causes the lifting pistons 16 to move downwards in the cylindrical openings 15, or, since the pistons 16 are prevented from moving downward because of engagement of their associated rods 18 with the ring 19 resting on the upper end of the suspension spring 64, the housing 13, and the head 10 move upward, also moving the body upward. To continue with the description of the reciprocation of the piston 23, downward movement thereof does not force fluid below the piston out through the opening 29 into the chamber 14, because the piston 23 is loose in the bore 22 and the periphery of the associated seal 24 bends upwards to allow fluid below the piston 23 to pass above the piston. This in effect constitutes a re-loading of the space between the piston 23 and the ball valve 42 with fluid. During continued reciprocation of the piston 23 each upward movement of the piston raises the body 13, head 10, and the vehicle body a certain amount. Eventually a condition is reached in which the body 13 is raised sufficiently for the end of the piston rod 25 no longer to contact the ring 81 during the aforementioned reciprocation due to jounce or bounce, and the raising of the vehicle body.

If now the load on the vehicle is reduced, the suspension spring 64 expands, moving the body 13 away from the wheel-connected member 12, the tube 66, and the ring 81. When sufficient expansion of the spring 64 has taken place, and perhaps because the body 13 may previously have been elevated with respect to the upper end of the spring 64 through reciprocation of the piston 23, the enlarged head 36 on the rod 34 moves upward into contact with the ring 81. When this has happened, any relative reciprocation due to jounce or bounce will cause the piston 31 to be reciprocated in the bore 30. In this reciprocation downward movement of the piston 31 will draw fluid into the bore 30 above the piston 31 by opening the ball valve 53, because the pressure beneath the ball valve 53 in the bore 30 is reduced below that above the ball valve maintained by the load of the vehicle acting on the fluid above the pistons 16. Upward movement of the piston 31 forces open the ball valve 61 and pumps fluid above the piston 31 through the passage 59 and the opening 60 back into the storage chamber 14. Continued reciprocation through the pumping action of the piston 31 decreases the amount of fluid above the pistons 16 and lowers the vehicle body, the head 10, and the body 13 with respect to the upper end of the suspension spring 64. When sufficient lowering has taken place, the enlarged head 36 on the valve rod 34 no longer contacts the ring 81 during reciprocation, and the pumping action of the piston 31 ceases.

The aforedescribed lifting and lowering apparatus is of special value for a vehicle that is to be subjected to loads of such a kind that a ratio of load plus body weight to body weight is relatively high. In a case like this if the suspension spring is made relatively stiff to limit the total deflection upon full load, the spring may provide too hard riding at light loads. If, on the other hand, the suspension spring is made relatively soft, the total deflection at full load may be very high. With my device it is possible to use the relatively soft spring and to compensate for the large total deflection of the spring at full load by shifting the body with respect to the part of the spring with which the body is associated.

I claim:

1. In a suspension, a first part, a second part, coiled resilient means supporting the second part for reciprocative movement on the first part, a third part, and an hydraulic lift device adjustably supporting the third part on the second part, said hydraulic lift device comprising means forming a liquid chamber between the second and third parts, a pump on the third part having an input member disposed within the coils of the coiled resilient means and projecting in the direction of the first part for energy receiving engagement therewith and being responsive to reciprocal movement of said third and second parts relative to said first part under a condition of heavy load on the resilient means for pumping liquid into the chamber, and a similar pump responsive to reciprocal movement of said third and second parts relative to said first part under a condition of light load on the resilient means for pumping liquid out of the chamber.

2. In a suspension, a first part, a second part, coiled resilient means supporting the second part for reciprocative movement on the first part, a third part, and an hydraulic lift device adjustably supporting the third part on the second part, said hydraulic lift device comprising means forming a liquid chamber between the second and third parts, a pump on the third part having an input member disposed within the coils of the coiled resilient means and projecting in the direction of the first part for energy receiving engagement therewith and being responsive to reciprocal movement of said third and second parts relative to said first part for pumping liquid into the liquid chamber to change the spacing of the third part in one direction with respect to the second part, and a similar pump responsive to reciprocal movement of said third and second parts relative to said first part for pumping liquid out of the chamber to change the spacing of the third part in the opposite direction with respect to the second part.

3. In a suspension, a first unit comprising a base member, a rod secured to the base member, a valved piston secured to the rod at a region spaced from the base member, a sleeve secured to the base member and extending therefrom in spaced surrounding relation to the rod and piston, a spring bracket secured to the exterior of the sleeve at a region adjacent the base member, and a ring secured to the inside of the end of the sleeve remote from the base member; a second unit comprising a liquid housing, a cylinder secured to the housing and extending therefrom so as slidably to receive the piston and to be slidably received in the interior ring attached to the sleeve, an end structure on the end of the cylinder remote from the housing slidably receiving the piston rod in sealing relation and being slidably received in the sleeve and rubber bumpers attached to the end structure and being engageable with the interior ring on the sleeve and the base member upon movement of the second unit to extreme positions with respect to the first unit; a coil spring surrounding the sleeve and having its lower end resting on the spring bracket attached to the sleeve; a plurality of pistons slidably mounted in the liquid housing and a plurality of rods attached to the pistons and projecting from the housing toward the coil spring so as to act against the upper end thereof; a first pumping means associated with the housing for moving the pistons and rods with respect to the housing in a direction toward the coil spring so as to shift the housing away from the base member of the first unit, said first pumping means including a first member protruding from the housing and engageable with the ring on the sleeve at a condition of high compression of the spring so as to effect a pumping action through reciprocation of the first member in contact with the ring; and a second pumping means for moving the pistons and rods with respect to the housing in a direction away from the coil spring, said second pumping means including a second member protruding from the housing through the ring on the sleeve and having a head engageable with the ring at a condition of low compression of the spring so as to effect a pumping action through reciprocation of the second member in contact with the ring.

4. In a suspension, a first unit comprising a spring support and a first hydraulic-shock-absorber part, spring means engaging the spring support, a second unit comprising a second hydraulic-shock-absorber part cooperating with the aforesaid first part, a liquid housing attached to the aforesaid second part and having a chamber combined with the aforesaid second part to form a storage reservoir, first, second, and third cylinders, a first passage between the upper ends of the first and second cylinders, a first valve cooperating with the first passage so as to permit liquid flow through said first passage only from the first cylinder to the second cylinder, a second passage between the upper ends of the second and third cylinders, a second valve cooperating with the second passage so as to permit liquid flow through said second passage only from the second cylinder to the third cylinder, a third passage between the upper ends of the third cylinder and the chamber, a third valve cooperating with the third passage so as to permit liquid flow through said third passage only from the third cylinder to the chamber, a fourth passage between the lower portions of the chamber and the first cylinder, a first piston slidable in the first cylinder, and having valve means and an extension engageable with the first unit upon heavy loading of the spring means so as to cause relative reciprocal movement of the first and second units to reciprocate the first piston thereby pumping liquid from the chamber through the fourth passage, the first cylinder, and the first passage to the second cylinder; a second piston slidably mounted in the second cylinder and having an extension engaging the spring means and being forced downwards in the second cylinder by the aforesaid introduction of liquid into the second cylinder by pumping action of the first piston and thereby acting through engagement of the second-piston extension with the spring means to raise the housing with respect to the first unit, and a third piston slidably mounted in the third cylinder and having an extension engageable with the first unit at a condition of light loading of the spring means and elevation of the housing with respect to the first unit so as to cause relative reciprocal movement of the first and second units to reciprocate the third piston thereby pumping liquid from the second cylinder through the second passage to the third cylinder and through the third passage to the reservoir chamber, the housing thus being permitted to be lowered with respect to the second piston and the first unit.

5. In a suspension, a first part, a second part, a spring carrying the second part by the first part, an hydraulic shock absorber acting between the parts in parallel with the spring, a housing having a chamber communicating with the shock absorber, a plurality of lifting cylinders, an inlet cylinder, and an outlet cylinder, lifting pistons in the lifting cylinders having rods projecting from the housing into engagement with the second part, an inlet valve piston in the inlet cylinder for controlling flow of liquid from the chamber to the lifting cylinders to shift the lifting pistons for elevating the housing with respect to the second part, a rod connected to the inlet valve piston and projecting from the housing into engagement with the first part under a condition of heavy loading imposed on the housing, a spring acting against the inlet valve piston to make it pump liquid from the chamber into the lifting cylinders by reciprocating upon relative reciprocation between the first part and the housing at the said condition of heavy loading, an outlet valve piston in the outlet cylinder for controlling flow of liquid from the lifting cylinders to the chamber to shift the lifting pistons for lowering the housing with respect to the second part, a rod connected to the outlet valve piston and projecting from the housing into engagement with the first part under a condition of light loading imposed on the housing, and a spring acting against the outlet valve piston to make it pump liquid from the lifting cylinders to the chamber by reciprocating upon relative reciprocation between the first part and the housing at the said condition of light loading imposed on the housing.

6. In combination, a load-carrying supported part, a part for supporting said load-carrying supported part, a compression spring load member and a shock absorber member disposed axially therewithin, said members each being mounted at one end to said supporting part and said shock absorber member having its opposite end connected to said load-carrying supported part, and automatic means operatively associating the opposite end of the compression spring and load-carrying supported part for maintaining within limits a predetermined net spacing between the supported and supporting parts irrespective of the particular mean length to which the load carrying supported part causes compression of the load spring member, said automatic means comprising structure including relatively separable piston and cylinder members one within the other and defining an included fluid containing space increasing and decreasing in volume with increase and decrease of relative separation between said piston and cylinder members, different ones of said piston and cylinder members having an operative connection with the respective load carrying supported part and the opposite end of the spring, and mechanical plunger pump means incorporated in the piston and cylinder structure and having at least one protruding plunger engageable with the supporting part during reciprocal movement of the supporting part thereto to operate the pump means for pumping to change the volume of the fluid in said fluid containing space.

7. In combination, a load-carrying supported part, a part for supporting said load-carrying supported part, a compression spring load member and a shock absorber member disposed axially therewithin, said members each being mounted at one end to said supporting part and said shock absorber member having its opposite end connected to said load-carrying supported part, and means operatively associating the opposite end of the compression spring and load-carrying supported part and including structure comprising relatively separable piston and cylinder members one within the other and defining an included fluid containing space increasing and decreasing in volume with increase and decrease of the relative separation between said piston and cylinder members, different ones of said piston and cylinder members having an operative connection with the respective load carrying supported part and the opposite end of the spring, and pumping means incorporated in the piston and cylinder structure and having at least one protruding plunger engageable with a portion of the supporting part during reciprocal movement of the supported part thereto to operate the pumping means for changing the volume of the fluid in said fluid containing space.

8. In a suspension system, a supporting element, a supported spring having a receiving portion, and a load-carrying lift device engaging the receiving portion of the spring in a manner such as to be resiliently mounted for reciprocative motion thereby under conditions including relatively high and relatively low spring loadings, said load-carrying lift device having associated therewith power pump means for adjusting the degree of lift thereof, and including a plunger having a thrust-receiving portion engageable by said supporting element during said reciprocative motion under at least one of said relative spring loadings for utilizing by energy transformation the thrust forces of reciprocation to power the pump means and adjust the said degree of lift of the device.

9. In a suspension system, a supporting element, a supported spring having a receiving portion, and a load-carrying lift device engaging the receiving portion of the spring in a manner such as to be resiliently mounted for reciprocative motion thereby under conditions including relatively high and relatively low spring loadings, said load-carrying lift device having associated therewith power pump means for adjusting the degree of lift thereof, and including a plunger having a thrust-receiving portion engageable by said supporting element during said reciprocative motion under at least one spring loading for utilizing by energy transformation the thrust forces of reciprocation to power the pump means and adjust the said degree of lift of the device, said load-carrying lift device comprising the combination with hydraulic jack and reservoir components for hydraulic fluid, of associated valving cooperating with the power pump means to effect transfer of fluid from at least one of the components to the other.

10. In a suspension system, a supporting element, an end-supported coil spring having a receiving portion adjacent the opposite end thereof, a telescopic shock absorber disposed within the spring and having an end in the vicinity of said opposite end of the spring, and a load-carrying lift device containing an hydraulic chamber and engaging the receiving portion of the spring and said end of the shock absorber in a manner such as to be resiliently mounted for damped reciprocative motion thereby under conditions including relatively high and relatively low spring loadings, said load-carrying lift device having associated therewith power pump means for adjusting the degree of lift thereof, and including a plunger having a thrust receiving portion engageable by said supporting element during said reciprocative motion under at least one of said relative spring loadings for utilizing by energy transformation the thrust forces of reciprocation to power the pump means and adjust the said degree of lift of the device, said hydraulic chamber being cooperatively disposed adjacent said shock absorber and power pump means to serve as reservoir in common.

JOHN P. BUTTERFIELD.

REFERENCES CITED

The following references are of record in the file of this patent:

UNITED STATES PATENTS

| Number | Name | Date |
| --- | --- | --- |
| 2,379,012 | Lee | June 16, 1935 |
| 2,021,043 | Bedford | Nov. 12, 1935 |
| 2,361,575 | Thompson | Oct. 31, 1944 |